United States Patent [19]

Hershberger

[11] 4,217,721
[45] Aug. 19, 1980

[54] WEEDLESS FISHHOOK

[76] Inventor: Welcome D. Hershberger, 16135 Petro Dr., Mishawaka, Ind. 46544

[21] Appl. No.: 957,646

[22] Filed: Nov. 3, 1978

[51] Int. Cl.³ ............................................. A01K 83/00
[52] U.S. Cl. ...................................... 43/43.2; 43/42.1; 43/42.41
[58] Field of Search ...................... 43/43.2, 42.1, 42.41

[56] References Cited

U.S. PATENT DOCUMENTS

| | | | |
|---|---|---|---|
| 534,506 | 2/1895 | Hastings | 43/42.1 |
| 981,454 | 1/1911 | Miller et al. | 43/42.1 |
| 1,689,027 | 10/1928 | Helle | 43/42.1 |
| 2,136,713 | 11/1938 | Schnabel | 43/42.41 |
| 2,191,244 | 2/1940 | Wise | 43/42.1 |
| 2,590,461 | 3/1952 | Rasch | 43/42.1 |
| 3,060,620 | 10/1962 | Binkowski | 43/42.41 |
| 3,170,756 | 2/1965 | Butler | 43/42.1 |
| 3,688,430 | 9/1972 | Balch | 43/42.1 |
| 3,815,274 | 6/1974 | Schleif | 43/42.1 |
| 3,983,655 | 10/1976 | Kolesar | 43/42.1 |

FOREIGN PATENT DOCUMENTS

| | | | |
|---|---|---|---|
| 2511860 | 10/1976 | Fed. Rep. of Germany | 43/42.1 |
| 2606305 | 8/1977 | Fed. Rep. of Germany | 43/43.2 |
| 2633667 | 2/1978 | Fed. Rep. of Germany | 43/43.2 |
| 1101282 | 4/1955 | France | 43/42.1 |
| 1105323 | 6/1955 | France | 43/42.1 |
| 1248602 | 11/1960 | France | 43/42.1 |

Primary Examiner—Nicholas P. Godici
Assistant Examiner—J. T. Zatarga
Attorney, Agent, or Firm—Olsen and Stephenson

[57] ABSTRACT

A weed shield attachment is disclosed that is used on a conventional fishhook, such as a single, double or treble hook. The attachment is a thin plastic bulbous shaped element which has a central sleeve for fitting on the stem of the hook and an integral bulbous skirt that extends rearwardly from the forward end of the sleeve, inward of but immediately adjacent to the pointed end or ends of the fishhook to deflect away weeds. The skirt is flexible so that it will collapse to enable a fish to be caught on the hook.

5 Claims, 5 Drawing Figures

WEEDLESS FISHHOOK

BACKGROUND OF THE INVENTION

The present invention relates to a weedless fishhook and particularly to an improved attachment for fishhooks that will minimize weed problems when fishing.

It is known to provide weedless fishhooks which have mechanical elements for deflecting weeds during fishing operations, but such fishhooks are relatively costly and are not always available to the fisherman when he may need them. There has been a long felt need for a low-cost weedless device that can easily be carried by the fisherman so as to be available when needed, and which can be attached to any conventional fishhook.

SUMMARY OF THE INVENTION

The present invention has overcome inadequacies of the prior art to provide a weedless fishhook which includes a conventional fishhook and a unique attachment that can readily be fitted onto the fishhook.

The attachment is a unitary structure of a suitable form sustaining resilient material which has a sleeve that can be fitted onto the stem of the fishhook and a bulbous skirt which is integrally connected to the sleeve at the forward end thereof. The bulbous skirt functions to deflect weeds from the pointed ends of the fishhook, but the skirt is sufficiently yieldable so that it will readily collapse to allow a fish that may strike to be caught on the hook. Various suitable configurations of the skirt may be employed.

Thus, it is a primary object of the present invention to provide an improved weedless fishhook attachment for use on a conventional fishhook, whether it be single, double or treble, and which is constructed and arranged so that it will be a low-cost item that can easily be added to or removed from a fishhook and will effectively eliminate weed problems for the fisherman without detracting from the ability of the fishhook to catch a fish which may strike the fish lure to which the fishhook is connected.

Other objects of this invention will appear in the following description and appended claims, reference being had to the accompanying drawing, forming a part of this specification wherein like reference characters designate corresponding parts in the several views.

DESCRIPTION OF THE PREFERRED EMBODIMENTS

Figure 1:
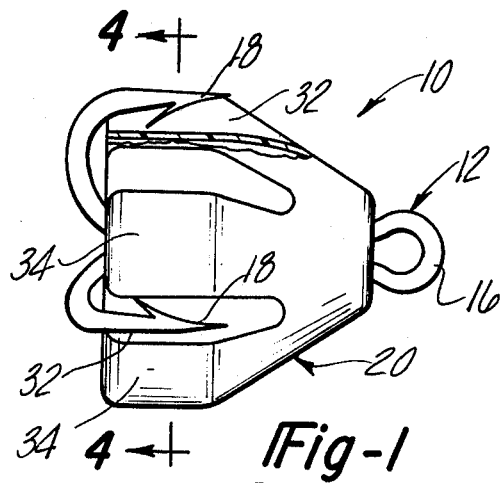
FIG. 1 is a side elevational view of a weedless hook assembly embodying the present invention, a portion being broken away for illustration purposes.
Figure 2:
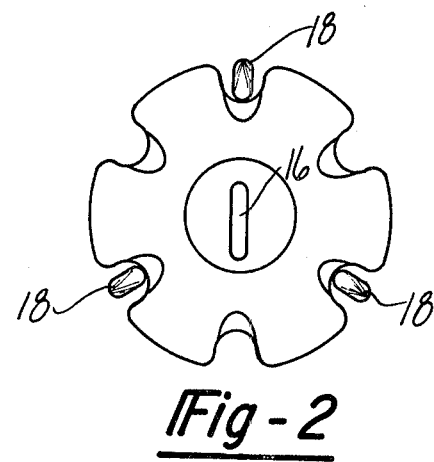
FIG. 2 is a front elevational view of the weedless fishhook assembly.
Figure 3:
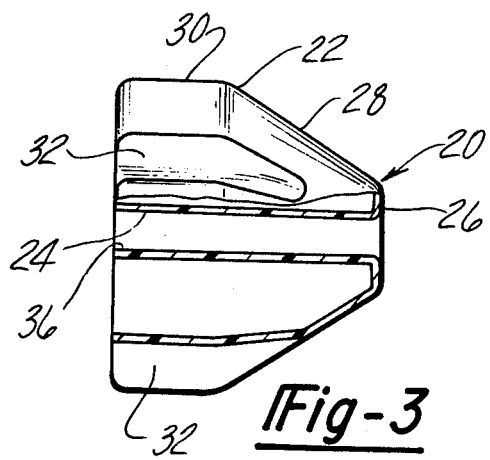
FIG. 3 is a side elevational view of the weed shield attachment illustrated in FIG. 1, with a portion broken away to show the internal construction of the attachment.
Figure 4:
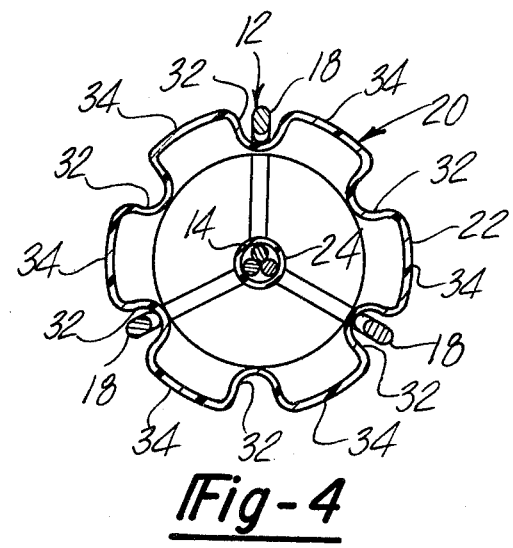
FIG. 4 is a transverse section taken on the lines 4—4 of FIG. 1.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the embodiment of the invention shown in FIGS. 1-4 will be described. The weedless fishhook assembly 10 includes a conventional treble fishhook 12 having a stem 14, at one end of which is the eyelet 16 and at the other end of which are the three pointed barbs 18. In the illustrated embodiment a treble hook is utilized, but it will be understood that a conventional single or double hook may be utilized without departing from the scope of the present invention.

The weedless fishhook assembly also includes the weed shield attachment 20 which includes the external bulbous skirt 22 and the internal sleeve 24 which is integrally connected to the skirt 22 at the head end 26 thereof.

The skirt 20 is flared outwardly from the head end 26, as shown at 28, and the flared portion 28 terminates in a generally cylindrical portion 30. The cylindrical portion 30 has six longitudinally extending grooves 32 which project radially inwardly, and three of the alternate grooves 32 accommodate the pointed barbs 18. By virtue of this arrangement the skirt 20 radiates outwardly so that the lands 34 located between the grooves 32 are positioned radially outwardly of the pointed barbs 18, thereby enabling the weed shield attachment 20 to deflect weeds away from the fishhook 12 so as not to be caught thereon. The sleeve 24, which is mounted on the stem 14, assures that the weed shield attachment 20 will remain in the desired position with respect to the fishhook 12 irrespective of the number of individual pointed barbs 18 that may be a part of the fishhook 12. The weed shield attachment 20 can be made of any suitable form sustaining, resilient material which will have sufficient resistance to deformation to deflect weeds away from the fishhook 12, but which will collapse if a fish strikes the fish lure to which the weedless fishhook assembly 10 is attached to permit the fish to be caught on the fishhook when it strikes the lure. One suitable material for this purpose is Plastisol 50 Durometer, Clear. Other similar elastomeric or organic plastic materials may be used.

The weed shield attachment 20 can quickly and easily be inserted onto a fishhook 12, merely be passing the one end 36 over the eyelet 16 and sliding the sleeve 24 lengthwise on the stem 14 so that the pointed barbs 18 are confined within the associated grooves 32.

Figure 5:
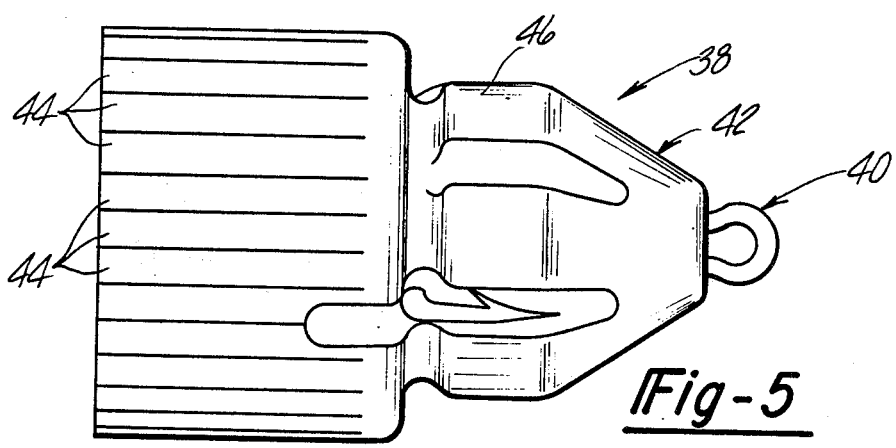
FIG. 5 is a side elevational view of a weedless fishhook assembly embodying a modified form of the invention.

In the embodiment of the invention shown in FIGS. 1-4, inclusive, the skirt 22 terminates at the rearward end of the cylindrical portion 30, but other suitable arrangements may be used if desired. For example in the embodiment of the invention shown in FIG. 5, a weedless fishhook assembly 38 is provided which has a treble fishhook 40 constructed the same as the fishhook 12 in the previously described embodiment. A weed shield attachment 42 is fitted thereon in essentially the same manner as previously described, but the weed shield attachment 42 has a plurality of streamers 44 extending rearwardly from the cylindrical portion 46. The streamers can be used to conceal the fishhook 40, or they may be used optionally to modify the action or movement of the fish lure (not shown) when moved through water.

It is claimed:

1. A weed shield attachment for a fishhook that has a stem terminating at one end in a return bent portion with a pointed barb at its terminus, said pointed barb being located radially outwardly of said stem, said attachment being formed of thin sheet material and comprising an external bulbous shirt having head and tail ends, and an internal sleeve integrally connected to said skirt only at said head end, said sleeve having an internal diameter of a size sufficient so that it can fit on the stem of said hook, and said skirt flaring outwardly in spaced relationship to said sleeve from said head end toward said tail end and terminating in a generally cylindrical portion at said tail end and having an external diameter at said tail end so that it can fit in close proximity to the radially inner side of the barb, said cylindrical portion having at least one longitudinally extending groove projecting radially inwardly in which the barb of the fishhook can be located, said skirt having resilient form sustaining properties to enable it to deflect weeds from the barb and yieldable so that it can collapse in response to a fish striking the hook.

2. The weed shield attachment that is defined in claim 1, wherein said cylindrical portion has a plurality of said grooves spaced at uniform sixty degree intervals.

3. The weed shield attachment that is defined in claim 2, which is made of an organic plastic material.

4. The weed shield attachment that is defined in claim 2, wherein said skirt terminates at the rearward end of said cylindrical portion.

5. The weed shield attachment that is defined in claim 2, wherein said skirt has a plurality of streamers extending rearwardly from said cylindrical portion for aiding in concealing said fishhook.

* * * * *